United States Patent
Galler (10) Patent No.: US 10,472,879 B1
(45) Date of Patent: Nov. 12, 2019

(54) SECURE DISPLAY SAFE (71) Applicant: Sam Galler, Wheaton, IL (US)

(72) Inventor: Sam Galler, Wheaton, IL (US)

( * ) Notice: Subject to any disclaimer, the term of this patent is extended or adjusted under 35 U.S.C. 154(b) by 0 days.

(21) Appl. No.: 15/845,655

(22) Filed: Dec. 18, 2017

(51) Int. Cl.
| | | |
|---|---|---|
| *E05G 1/026* | (2006.01) | |
| *E05G 1/04* | (2006.01) | |
| *E05G 1/10* | (2006.01) | |
| G01S 19/16 | (2010.01) | |
| E05C 1/00 | (2006.01) | |

(52) U.S. Cl.
CPC ............ *E05G 1/026* (2013.01); *E05G 1/04* (2013.01); *E05G 1/10* (2013.01); *E05C 1/006* (2013.01); *G01S 19/16* (2013.01)

(58) Field of Classification Search
CPC .. E05G 1/026; E05G 1/04; E05G 1/10; E05G 2700/00; E05G 2700/02; E05G 2700/04; E05C 1/006; G01S 19/16
USPC ..... 70/63; 109/50–53, 56, 57; 248/551–553; 42/70.11; 312/215, 222, 242, 245; 206/317; 220/210; 224/912, 913
See application file for complete search history.

(56) References Cited

U.S. PATENT DOCUMENTS

| | | | | |
|---|---|---|---|---|
| 1,602,865 A | * | 10/1926 | Stockov | .............. E05B 65/0092 292/36 |
| 2,955,861 A | * | 10/1960 | Claud-Mantle | ......... E05C 19/14 220/324 |
| 3,391,256 A | * | 7/1968 | Nawman | ............. H04M 17/026 292/167 |
| 3,464,606 A | | 9/1969 | Nordeen | |
| 3,566,526 A | | 3/1971 | La Violette | |
| 3,871,197 A | * | 3/1975 | Waxgiser | ................ E05B 37/02 109/64 |
| 4,155,608 A | | 5/1979 | Orlewicz | |
| 4,309,065 A | * | 1/1982 | Pappas | ................. A47B 81/005 224/912 |
| 5,172,575 A | * | 12/1992 | Fisher | ..................... E05B 37/20 206/317 |
| 5,265,950 A | | 11/1993 | Atkinson | |
| 5,416,826 A | | 5/1995 | Butler | |
| 5,483,905 A | * | 1/1996 | Johansson | .............. A47B 81/00 109/49.5 |
| 5,484,092 A | * | 1/1996 | Cheney | .................... B60R 7/14 206/317 |

(Continued)

FOREIGN PATENT DOCUMENTS

| | | |
|---|---|---|
| CN | 2895656 | 5/2007 |
| CN | 103670131 | 3/2014 |

*Primary Examiner* — Lloyd A Gall
(74) *Attorney, Agent, or Firm* — The Law Offices of Konrad Sherinian (57) ABSTRACT

A stationary display firearm safe is adapted to be affixed to a stationary structure for safely containing and showing a firearm or a different valuable item. The safe includes a body, an inner cover disposed within the body, and a front cover rotatably coupled to body to provide added security. A magnet is attached to the inner box for holding a firearm in space. The safe also includes a locking system with a lock set reinforcement, a tamper resistant latch rod, a lock set, a latch retainer set and a latch bolt set. The safe also includes a lighting system powered by a battery disposed within a chamber formed between the inner box and the body. The inner box incorporates a set of lips mating with a high impact resistance glass disposed in a frame of the cover when the safe is locked.

1 Claim, 8 Drawing Sheets

(56) References Cited

U.S. PATENT DOCUMENTS

| | | | |
|---|---|---|---|
| 5,621,996 A | 4/1997 | Mowl, Jr. | |
| 5,662,219 A * | 9/1997 | Tschudy | A45C 13/02 |
| | | | 150/113 |
| 5,685,239 A * | 11/1997 | Bentley | E05G 1/00 |
| | | | 109/50 |
| 5,769,006 A * | 6/1998 | Allaer | E05G 1/00 |
| | | | 109/51 |
| 5,901,589 A | 5/1999 | Cordero | |
| 6,260,300 B1 * | 7/2001 | Klebes | F41A 17/066 |
| | | | 206/317 |
| 6,363,760 B1 | 4/2002 | Sigmond | |
| 6,488,148 B1 * | 12/2002 | Woodson | B65D 25/10 |
| | | | 206/1.5 |
| 6,845,640 B2 * | 1/2005 | Loeff | E05B 53/003 |
| | | | 109/45 |
| 6,895,789 B2 * | 5/2005 | Masseth, Jr. | E05B 17/2038 |
| | | | 292/122 |
| 7,116,224 B2 | 10/2006 | Mickler | |
| 7,743,935 B2 * | 6/2010 | Maid | A47G 29/20 |
| | | | 220/210 |
| 8,683,727 B2 | 4/2014 | McLean, III | |
| 8,726,556 B1 | 5/2014 | Willingham | |
| 8,739,584 B2 * | 6/2014 | Kargilis | E05B 9/084 |
| | | | 70/208 |
| 8,869,576 B2 * | 10/2014 | O'Leary | E05B 47/023 |
| | | | 70/257 |
| 9,016,095 B2 * | 4/2015 | Dudgeon | E05G 1/08 |
| | | | 109/53 |
| 2003/0041787 A1 | 3/2003 | Gerstenkorn | |
| 2011/0175730 A1 | 7/2011 | Stevenson | |
| 2012/0068582 A1 * | 3/2012 | Elderkin | A47B 67/005 |
| | | | 312/7.1 |
| 2012/0227450 A1 * | 9/2012 | Ufkes | E05C 19/186 |
| | | | 70/277 |
| 2013/0025511 A1 | 1/2013 | Maxwell | |
| 2015/0168101 A1 | 6/2015 | Hyde | |

\* cited by examiner

SECURE DISPLAY SAFE

CROSS REFERENCE TO RELATED APPLICATIONS

None.

FIELD OF THE DISCLOSURE

The present invention generally relates to a safe, and more particularly relates to a stationary display safe. More particularly still, the present disclosure relates to a stationary display safe with added security.

DESCRIPTION OF BACKGROUND

In today's America, there are hundreds of millions of firearms, including guns and handguns. Firearms are lethal weapons and need to be stored in secure manners. Gun owners usually keep their firearms in secure drawers or other secure places in their homes. Firearms vendors lock their on-sale weapons in cabinets or other types of containers. Various types of cases and gun safes for storing firearms have been proposed and developed in the past. For example, U.S. Pat. No. 3,566,526 proposes a gun case including a magnet for holding a handgun in place. U.S. Pat. App. No. 20110175730 discloses an electronically operated gun safe incorporating an alarm system. U.S. Pat. No. 7,116,224 also teaches a portable firearm safe with an alarm system. U.S. Pat. App. No. 20150168101 proposes a portable gun case. C.N. Pat. No. CN2895656 proposes a portable gun safe with a small transparent window for viewing part of the gun contained therein. C.N. Pat. No. CN103670131 also proposes a portable gun safe with a small transparent window for viewing part of the gun contained in the portable safe.

The known prior art fails to teach important features coveted by firearm enthusiasts and proud firearm owners. Many of these firearms are expensive and beautifully crafted weapons. Their owners oftentimes desire to frequently view the firearms securely stored in safes. The convenient viewing satisfies their appreciation and proud of their firearms. They further desire the safes to present aesthetic appearance. Furthermore, the proud owners desire their display safes to be securely guarded and protected.

Accordingly, there is a need for a display safe with a transparent cover for viewing the entirety of the firearm or other valuable items disposed within the safe. The display safe is adapted to be affixed to a stationary structure, such as a wall of an office or house room, for providing convenient visibility of the firearm contained therein. In addition, the display safe needs to provide artistic features and be securely protected from theft.

OBJECTS OF THE DISCLOSED SYSTEM, METHOD, AND APPARATUS

Accordingly, it is an object of this disclosure to provide a display safe with a transparent cover providing the visibility of the entirety of the firearm disposed within the display safe.

Another object of this disclosure is to provide a display safe with a transparent cover providing the visibility of the entirety of the firearm suspended within the display safe.

Another object of this disclosure is to provide a display safe with a transparent cover providing the visibility of the entirety of the firearm or other collection items suspended within the display safe using magnetic force.

Another object of this disclosure is to provide a display safe with a transparent cover that is adapted to be affixed to a stationary structure.

Another object of this disclosure is to provide a display safe with a decorative frame and a transparent cover providing the visibility of the entirety of the firearm disposed within the display safe.

Another object of this disclosure is to provide a display safe having a transparent cover and connected to a security system.

Another object of this disclosure is to provide a display safe having a decorative frame and a transparent cover and connected to a security alarm system.

Another object of this disclosure is to provide a display safe having a global positioning system and a transparent cover and adapted to be affixed to a fixture.

Another object of this disclosure is to provide a display safe with a global positioning system, a transparent cover providing the visibility of the entirety of the firearm disposed within the display safe, a security system and a decorative frame.

Another object of this disclosure is to provide a stationary display safe with double walls.

Another object of this disclosure is to provide a stationary display safe with a locking system incorporating a stiff actuation rod.

Another object of this disclosure is to provide a stationary display safe with a locking system incorporating a lock reinforcement.

Another object of this disclosure is to provide a stationary display safe with a remotely controlled lighting system.

Another object of this disclosure is to provide a stationary display safe with a chamber for housing various components, such as a geo-fence system, an alarm, and a battery.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

Generally speaking, pursuant to the various embodiments, the present disclosure provides a stationary display safe including a body incorporating a body bottom and four body walls and adapted to be affixed to a stationary structure. The stationary display safe also includes an inner box adapted to be disposed within the body and housing a set of magnets for holding an item in space. In addition, the stationary display safe includes a front cover having a frame and a high impact resistant glass operatively coupled to the frame. The frame rotatably is coupled to the body for opening and closing the stationary display safe. The high impact resistant glass is transparent. The stationary display safe further includes a locking system including a latch bolt set mounted to the frame, a lock set attached to the body, a latch retainer set disposed within the body, and a tamper resistant latch rod connecting the lock set with the latch retainer set for locking or unlocking the safe. The latch retainer set is adapted to receive and release the latch bolt set. Moreover, the stationary display safe of claim includes a lock set reinforcement mounted to the body and operatively coupled to the lock set. The tamper resistant latch rod has a diameter of at least 0.14 inches.

Further in accordance with the present teachings is a stationary display firearm safe. The stationary display firearm safe includes a body incorporating a bottom side, a top side, a rear side, a left side and a right side. The bottom side, the top side, the rear side, the left side and the right side form an enclosure. The body is adapted to be affixed to a stationery structure. The stationary display firearm safe further includes a first locking mechanism embedded in the body, and a front side that is operatively coupled to the body and incorporates an entire transparent front cover of the stationary display safe. In addition, the stationary display firearm safe includes a second locking mechanism embedded in the front side. The first and second locking mechanisms operate together to open or close the stationary display firearm safe. Moreover, the stationary display firearm safe includes a magnet coupled to the rear side. The magnet is adapted to hold a firearm (such as a handgun or a long-gun) suspended within the enclosure by magnetic force. The entirety of the firearm is visible through the entire transparent front cover. Furthermore, the stationary display firearm safe includes a location device including a global positioning system receiver and a transmitter. The receiver receives signals from a set of satellites. The location device then determines a location of the display safe using the satellite signals. The transmitter periodically sends the location data to a location monitoring system. The location monitoring system stores the location into a database. The location is retrieved from the database later for determining the location of the stationary display firearm safe at a particular time or within a particular time frame.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skills in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

While the present disclosure may be susceptible to embodiment in different forms, there is shown in the Figures, and will be described herein in detail, specific embodiments, with the understanding that the disclosure is to be considered an exemplification of the principles of the present disclosure, and is not intended to limit the present disclosure to that as illustrated.

Figure 1:
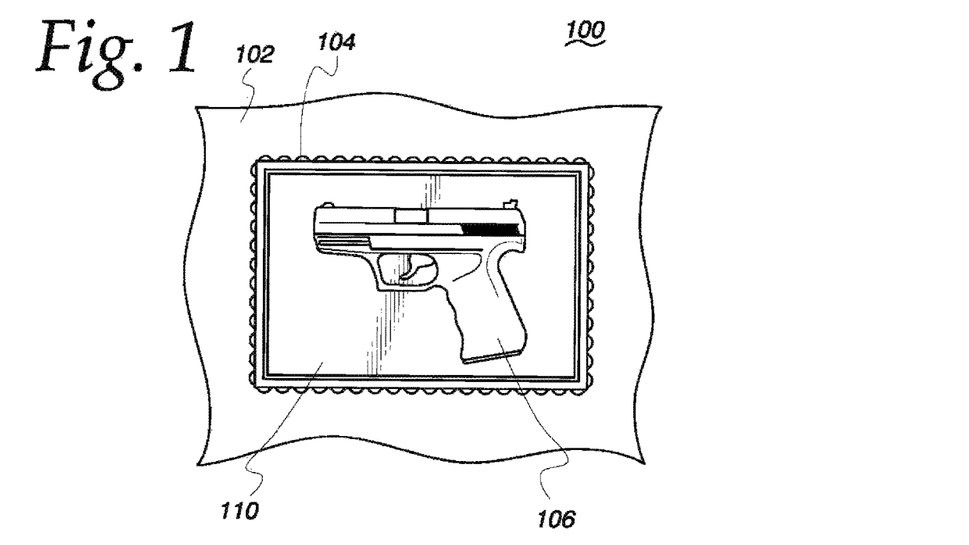
FIG. 1 is a front perspective view of a stationary display firearm safe in accordance with the teachings of this disclosure.

Turning to the Figures and to FIG. 1 in particular, a front perspective view of a display firearm safe is shown and generally indicated at 100. The display gun safe 100 is affixed to a structure 102, such as an office wall or a house wall. While the display safe 100 is mounted to the structure 102, it becomes a fixture, and cannot be easily removed from the structure 102 to prevent theft of the safe 100. In such a case, the display safe 100 is said to be stationary and not portable. In other words, the display firearm safe 100 is a stationary display safe, and is not a portable or mobile display safe. The stationary display safe 100 encloses a firearm 106, such as a handgun or a long-gun, suspended in space by magnetic force. The entirety of the front view of the firearm 106 is visible through a transparent front cover 110 of the display safe 100. The transparent front cover 110 allows the owner of the firearm 106 and other people to view the entire body of the firearm 106 at all times. In other words, the transparent front cover 110 allows the owner to appreciate the firearm 106 anytime he chooses to do so.

The display safe 100 also includes a decorative frame 104. The frame 104 aligns itself with the front periphery of the display safe 100. The frame 104 is attached to the body of the display safe 100 (or the structure 102) by, for example, one or more hooks. The frame 104 increases the appealing of the display safe 100 and the firearm 106, and makes the firearm 106 more enjoyable and attractive.

Figure 2:
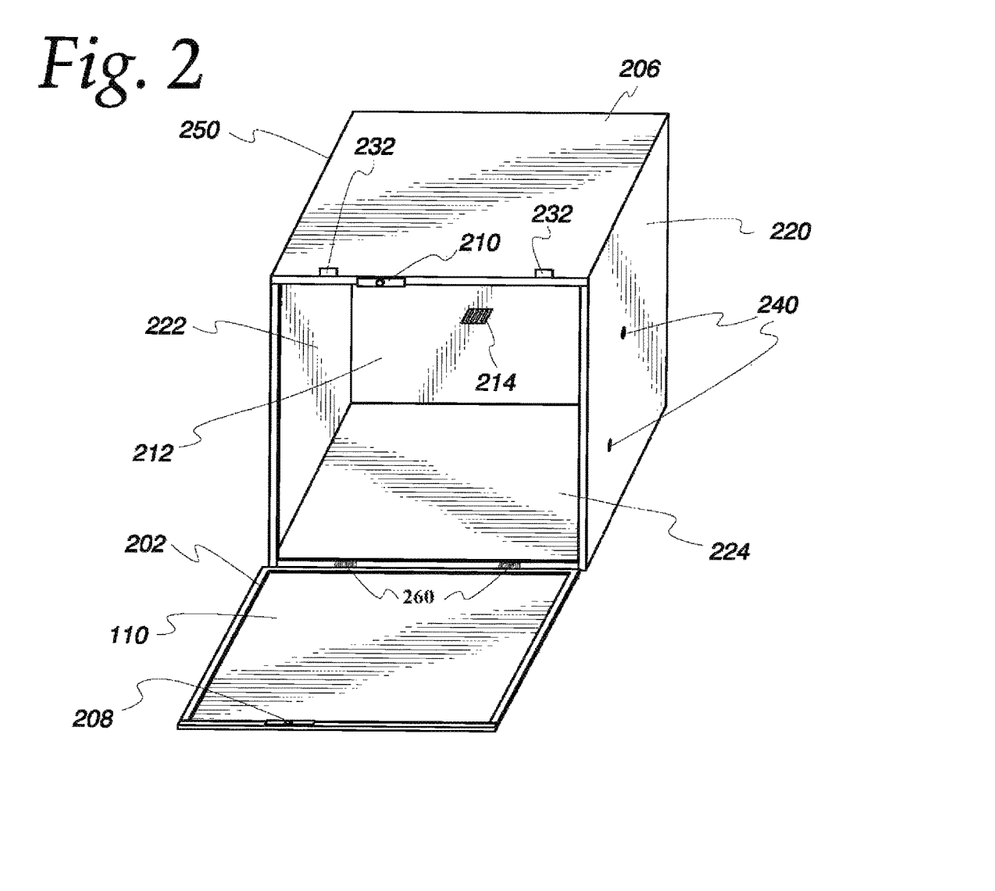
FIG. 2 is a front perspective view of a stationary display firearm safe in accordance with the teachings of this disclosure.

Referring to FIG. 2, a front perspective view of the display safe 100 is shown. The display safe 100 includes a front side 202 including the transparent front cover 110, a left side 222, a right side 220, a bottom side 224, a top side 206 and a rear side 212. The left side 222, right side 220, bottom side 224, top side 206 and rear side 212 form the body 250 of the display safe 100. The body 250 provides an enclosure for receiving the firearm 106. In one embodiment, the body 250 of the display safe 100 is integrally formed. Alternatively, the left side 222, right side 220, bottom side 224, top side 206 and rear side 212 are attached together by, for example, welding, bolting, clamping, screwing, pinning, stapling or gluing.

The front side 202 is rotatably attached to the bottom side 224 of the body 250. For example, the front side 202 pivots around two hinges (or axes) 260 to open or close the enclosure of the body 250. To close the display safe 100, the front side 202 is pivoted and makes contact with the top side 206. A locking mechanism 208 embedded inside the front side 202 and a corresponding locking mechanism 210 embedded inside the top side 206 are then operatively coupled together to secure the enclosure. In the closed state, the firearm 106 is safely disposed inside the display safe 100. In the closed state, the display safe 100 is said to be locked; and the firearm 106 is said to be locked inside the display safe 100. The locking mechanisms 208-210 are also used to open the display safe 100. In the open state, the firearm 106 can be placed into or removed from the display safe 100. The locking systems 208-210 can be, for example, a combination lock, a RFID lock, a Near-Field Communication ("NFC") enabled lock system, or a biometric based locking system (such as finger print or facial recognition based locking systems).

In a different implementation, the front side 202 is completely removed from the body 250 in the open state. For example, the bottom edge of the front side 202 incorporates two lips that are disposed within two cavities of the bottom side 224 when the front side 202 in the closed state. In such a case, the two lips are placed into the two cavities before the locking mechanisms 208-210 are operatively engaged to close the display safe 100. To open the display safe 100, the locking mechanisms 208-210 are operated to disengage from each other before the two lips are removed from the two cavities. For both of the two aforementioned illustrative implementations, the front side 202 is said to be operatively coupled to the body 250.

Figure 6:
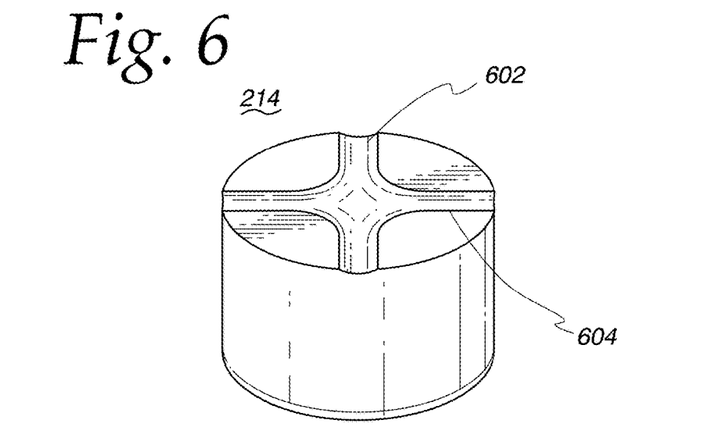
FIG. 6 is a front perspective view of a magnet in accordance with the teachings of this disclosure.

The rear side 212 is coupled with a magnet 214 for holding the firearm 106 in the space enclosed by the sides 206,212,220,222,224 and the front side 202 When the firearm 106 is heavy or big in size (such as a long-gun more than one magnet 214 can be used to hold the firearm 106 in proper orientation and position. A portion of or the entire firearm 106 is made of materials, such as steel, that are attracted to the magnet 214. The magnetic attraction force between the magnet 214 and the firearm 106 keeps the firearm 106 in position. In one embodiment, the magnet 214 incorporates a flat surface making contact with the firearm 106. In a different embodiment, the magnet 214 incorporates an irregular top surface, such as a curved contour, for the firearm 106 to be maintained in a more desired orientation when it makes contact with the magnet 214. Furthermore, the irregular top surface makes additional contact with the firearm 106 and thus increases the holding force. For example, the firearm 106 is suspended in space such that its side surface is substantially parallel to the surface of the structure 102. An illustrative magnet with an irregular surface is shown in FIG. 6. Two grooves incorporated in the top surface are indicated at 602 and 604 respectively. As used herein, a flat surface is said to be a regular surface or even surface.

The front side 202 incorporates a transparent cover 110, such as bullet proof glass. The transparent cover 110 occupies most area of the front side 202. At a minimum, the transparent cover 110 is big enough such that the entire side view of the firearm 106 is within the sight of a person standing a few feet from the front side 202. It should be noted that, in such a case, the person can be facing the display safe 100 straight or at an angle, such as thirty degrees. In one implementation, the areas of the front cover 110 and the front side 202 are same or substantially same. As used herein, the front cover 110 is said to be an entirely transparent front cover of the display safe 100.

The display safe 100 is configured to be affixed to the structure 102. For example, where the structure 102 is a room wall, a hole is cut out of the structure 102. The display safe 100 is then placed inside the hole. To firmly mount the display safe 100 to the structure 102, metal rods or metal screws can be employed. For example, one end of a rod is received by an aperture 240 within the right side 220; and the opposite end of the rod is received by an aperture of a beam within the structure 102. In one implementation, the apertures 240 are threaded apertures.

Figure 3:
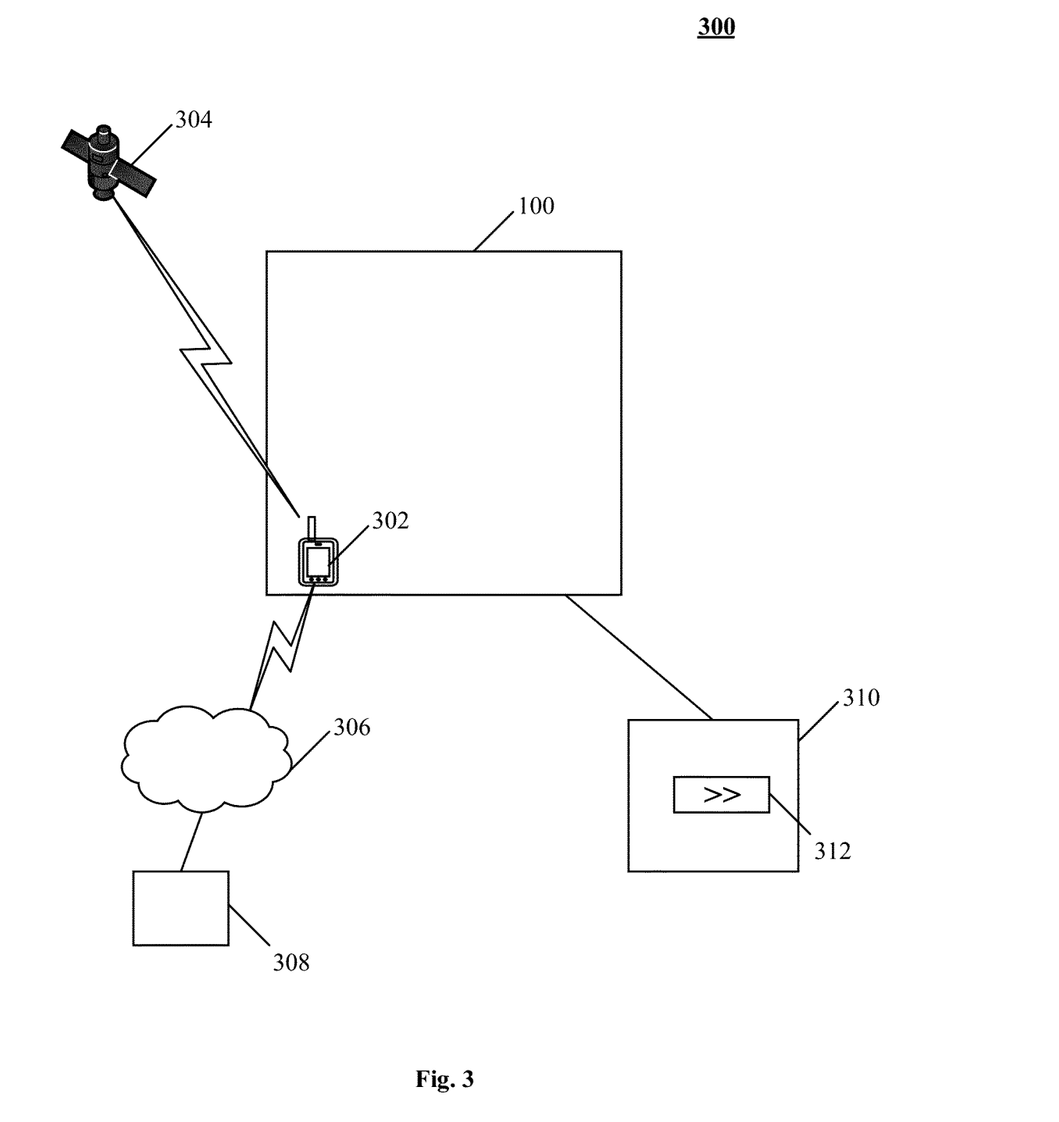
FIG. 3 is a block diagram of a security system with a display safe in accordance with the teachings of this disclosure.

Referring to FIG. 3, a block diagram of a security system including the display safe 100 is shown and generally indicated at 300. The display safe 100 includes a location device 302 for determining the location of the device 302, i.e., the physical location of the display safe 100. The location device 302 can be disposed within, for example, the rear side 212. In one implementation, the location device 302 incorporates a Global Positioning System ("GPS") component. The GPS subsystem 302 receives signals from a set of satellites 304, and determines the location of device 302 using the satellite signals based on triangulation. The determined location can be represented by a set of coordinates, for example, longitude, longitude and altitude. The location device 302 further sends the physical location (also referred to herein as GPS location) to a monitoring system 308 over a network 306, such as a public cellular network, using a transmitter.

Figure 4:
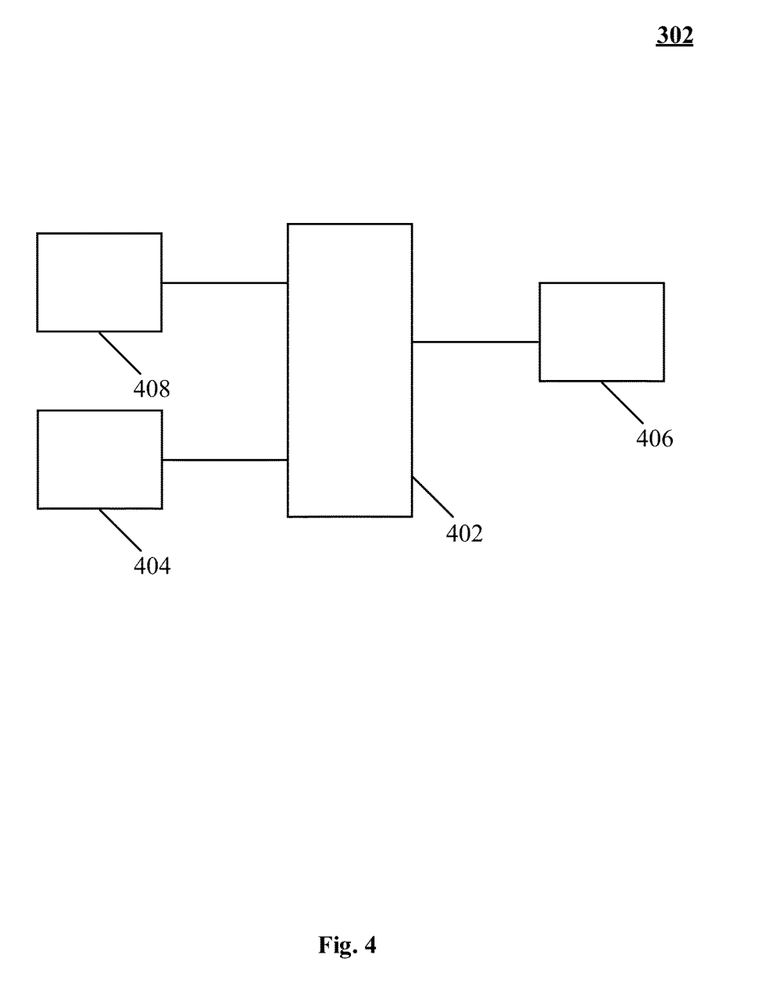
FIG. 4 is a block diagram of a location device operatively incorporated in a display firearm safe in accordance with the teachings of this disclosure.

The GPS component and the transmitter are further shown in FIG. 4. The location device 302 includes a controller 402, the GPS component 404 (also referred to herein as a GPS receiver or receiver), the transmitter 406 and a battery 408. In one embodiment, the location device 302 periodically sends the GPS location to the monitoring system 308 to save power consumption since the location device 302 is powered by a battery. For example, the location device 302 sends the GPS location of the display safe 100 every thirty minutes or sixty minutes. The GPS tracking feature of the display safe 100 is further illustrated by reference to FIG. 5.

Figure 5:
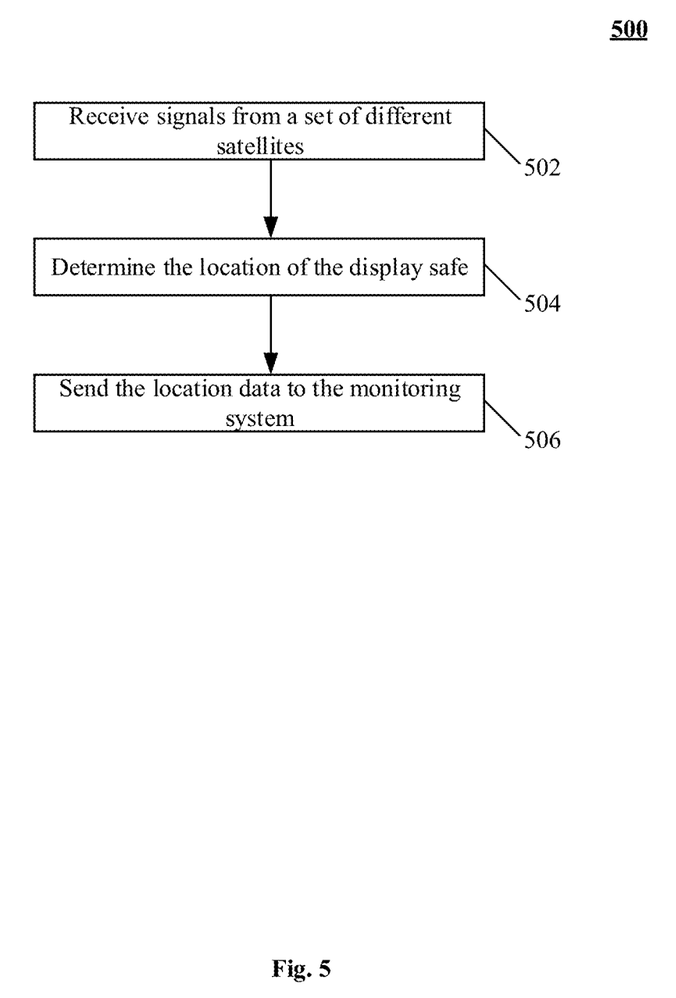
FIG. 5 is a flow chart illustrating the process by which a location device within a display firearm safe tracks the location of the display safe in accordance with the teachings of this disclosure.

Referring to FIG. 5, a flow chart depicting a process by which the location device 302 tracks the location of the display safe 100 is shown and generally indicated at 500. At 502, the location device 302 receives signals from a set of different satellites 304. At 504, the location device 302 determines the GPS location of the display safe 100 from the signals using, for example, triangulation. At 506, the location device 302 sends the location data to the monitoring system 308. The data sent along with the location to the monitor system 308 also includes an identifier of the display safe 100. In response, the monitoring system 308 stores the location data of the display safe 100 into, for example, a database. The time when the data is received can also be saved into the database.

The saved location data can then be used to trace the whereabouts of the display safe 100. For example, when the display safe 100 is stolen, the present location of the display safe 100 can be retrieved from the database for the law enforcement professionals to recover the stolen stationary display safe 100. It should be noted that the element 504 can also be performed periodically, such as every thirty minutes or sixty minutes, to extend the battery life.

Turning back to FIG. 300, the display safe 100 is further connected to a security subsystem 310 for safe guarding the display safe 100. In one implementation, the security subsystem 310 includes a motion sensor 312. When the display safe 100 is moved or otherwise compromised, the movement is detected by the motion sensor 312. The motion sensor 312 then triggers the security subsystem 310. When triggered, the security subsystem 310 may turn on an alarm. Alternatively, the security subsystem 310 generates an audible alarm and/or alerts a safety system, such as a police station or other types of safety agencies. Alternatively, the security subsystem 310 is a geo-fence system that generates an audible alarm and/or alerts a safety system when the safe 100 is removed away beyond a predetermined radius.

Figure 7:
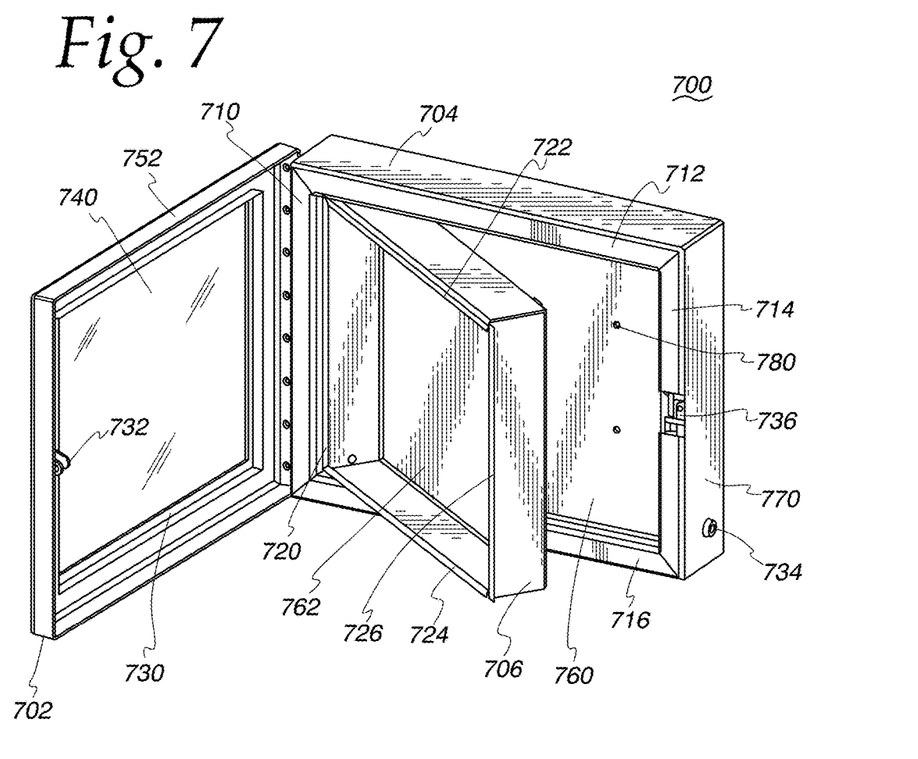
FIG. 7 is a front perspective view of a stationary display safe in accordance with the teachings of this disclosure.

Referring now to FIG. 7, a perspective view of a stationary safe is shown and generally indicated at 700. The stationary safe 700 includes a cover 702, a body 704 and an inner box 706. The cover 702 includes a frame 752 and a break proof glass 740 affixed to the frame 752. The glass 740 is transparent. In one implementation, the glass 740 is polycarbonate glass with a thickness of three quarters of an inch. The glass 740 has high impact resistance. Since polycarbonate glass has low scratch resistance, in a further implementation, the outer surface of the glass 740 is coated with another transparent layer material. Alternatively, the cover 702 includes an exterior layer of glass with higher scratch resistance disposed outside of the glass 740. The frame 752 is rotatably attached to the body 704. Accordingly, the cover 702 is also said to be rotatably attached to the body 704.

The body 704 includes a bottom surface 760 and four walls. Four lips 710, 712, 714 and 716 extend inward from the four walls respectively. The lips 710-716 also extend downward. The inner box 706 includes a bottom surface 762 and four walls as well. Four lips 720, 722, 724 and 726 extend away from the four walls of the inner box 706. In particular, the lips 720-724 extend inward while the lip 726 extend outward from the four walls respectively. When the safe 700 is assembled, the inner box 706 is disposed inside the body 704. In one implementation, the lip 726 is aligned along the lip 714. Both the body 704 and the inner box 706 are made of hard to break materials, such as steel.

The stationary display safe 700 also includes an improved locking system for securing valuable items stored inside the safe. The locking system is further illustrated by reference to FIGS. 8 and 7 and generally indicated at 800. The improved locking system 800 includes a latch bolt set 732 mounted to the frame 752, a latch retainer set 736 disposed in and mounted to the body 704, a lock set 840 attached to the body 704, a tamper resistant latch rod 802 connecting the latch retainer set 736 and the lock set 840, and a lock set reinforcement 804 mounted to the body 704.

Figure 8:
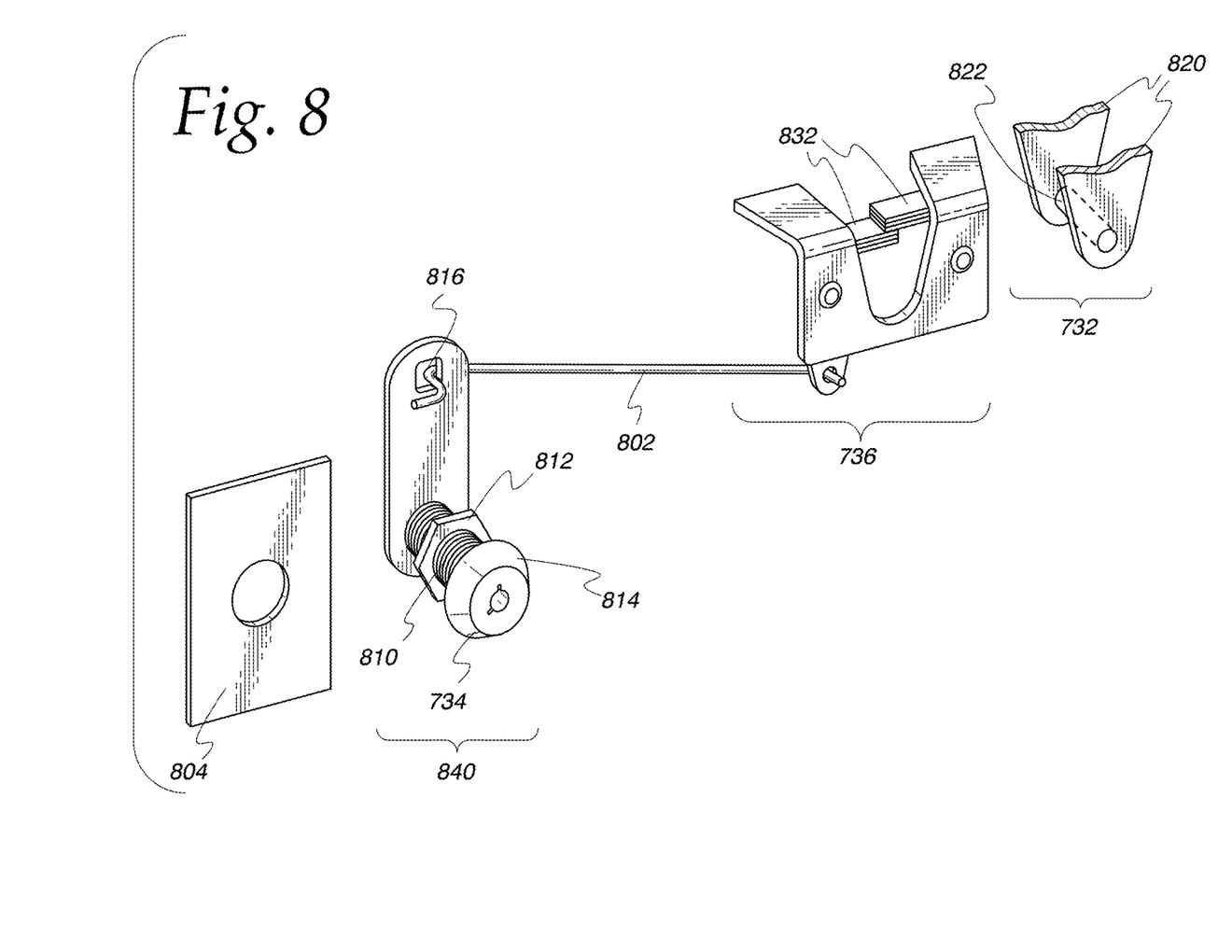
FIG. 8 is an exploded view of a locking system for a stationary display safe in accordance with the teachings of this disclosure.

The latch bolt set 732 includes two bridges 820 and a bolt 822. The latch bolt set 732 can be integrally formed. Alternatively, the bolt 822 is coupled to the two bridges 820 by, for example, threads. As used herein, the bolt 822 is said to be affixed to said two bridges 820. The bridges 820 are welded to the frame 752, or integrally formed with the frame 752. As used herein, the latch bolt set 732 is said to be mounted to the frame 752 whether it is welded to, integrally formed with, or otherwise coupled with the frame 752. In one implementation, the bolt 822 has a diameter of approximately 0.1483 inches. The double bridges 820 and the thick bolt 822 provided increased safety.

The latch retainer set 736 includes two latches 832. When the cover 702 placed in a closed position, the bolt 822 is pushed downward and through the latches 832. Accordingly, the bolt 822 is enclosed by the latches 832. Actuated by the lock 840 via the latch rod 802, the latches 832 are set into a locked position. In such a case, the bolt 822 is locked into the latch retainer set 736; and the safe 700 is in a locked position. When a user operates the lock set 840 to open the safe, via the latch rod, the latches 832 are set into an open position; and the bolt 822 can be pulled away from the latch retainer set 736. In such a case, the safe 700 is opened.

Conventional lock actuation links are usually flexible plastic cables, thin wires or chains. The conventional links are easy to be tampered with. For instance, an intruder could use a hook to pull the links and thus actuate the lock retainer set 736 to open the safe 700. Different from conventional lock actuation links, the tamper resistant latch rod 802 is a stiff metal rod resistant to be bent when pulled from a middle point. Accordingly, the tamper resistant latch rod 802 further improves the safety provided by the safe 700.

Conventional locks, such as a cam lock, can be easily tampered. For instance, an intruder can use a screw driver or a similar device to forcefully twist or bend the lock and the structure to which is the lock is attached, and thus comprises the security of safes. To overcome such a drawback, the locking system 800 incorporates a lock set reinforcement 804. The lock set reinforcement 804 is made of metal and mounted to the wall 770 of the body 704, or integrally formed with the wall 770. It incorporates an aperture for receiving the cylinder 810 of the lock set 840. When the safe 700 is assembled, the lock set reinforcement 804 is disposed between a stopper 812 and inner surface of the wall 770. A lock housing 814 of the lock set 840 is disposed on the outside of the wall 770. Accordingly, it is said herein that lock set reinforcement 804 is operatively coupled with the lock set 840 to prevent tampering of the lock set 840.

Figure 9:
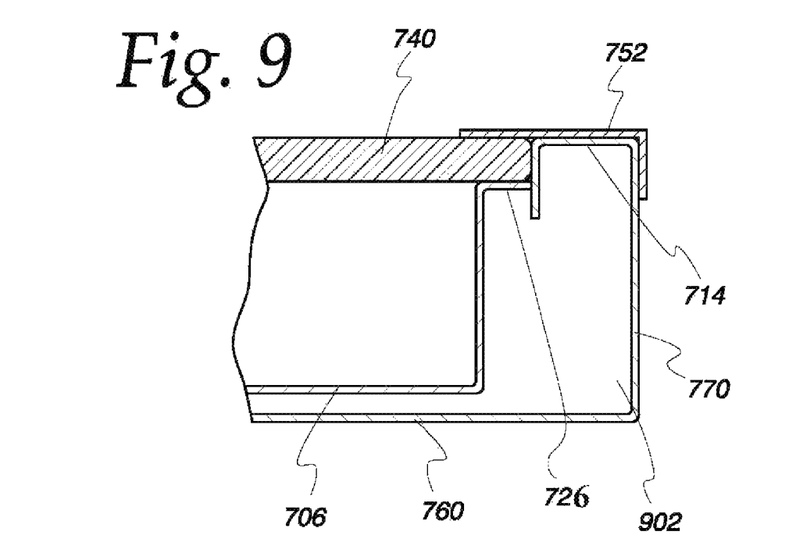
FIG. 9 is a cross-sectional view of a stationary display safe in accordance with the teachings of this disclosure.

Referring to FIG. 9, a partial cross-sectional view of the safe 700 in a locked position is shown. The glass 740 rests on top of the lip 724. The lips 720-724 recede inward from the lips 710-716 for receiving the glass 740. As used herein, the glass 740 is said to mate with the lips 720-726 and mesh with the lips 710-716 when the safe 700 is closed. The lips 720-726 provide added structural integrity. The frame 752 is in contact with or in a close proximity of the lip 714. Between the inner box 706 and the wall 770, a chamber 902 is formed. The chamber 902 provides space for housing the locking system 800. The bottom surface of the inner box 706 can make contact with the bottom surface of the body 704. Alternatively, the bottom surface of the body 704 provides one or more supports, which make contact with or are in close proximity of the bottom surface of the inner box 706.

Figure 10:
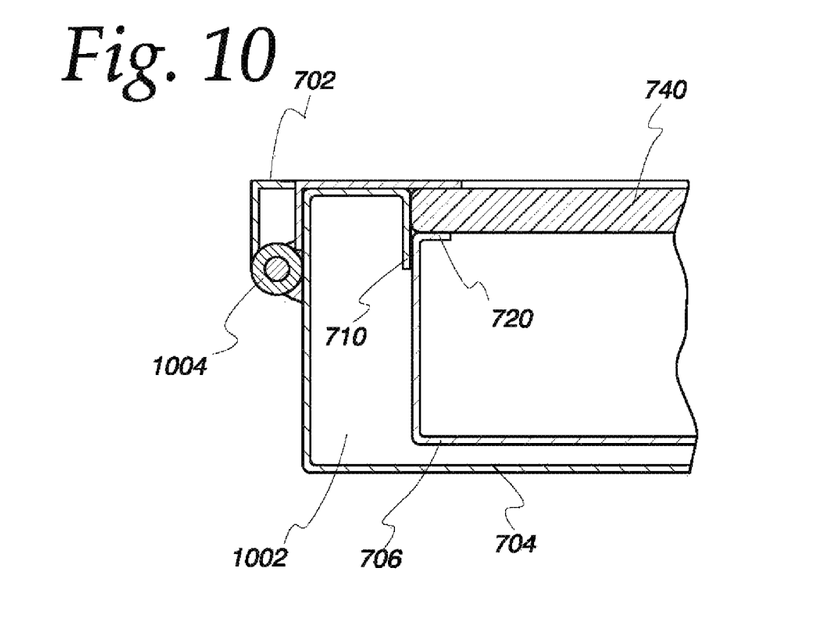
FIG. 10 is a cross-sectional view of a stationary display safe in accordance with the teachings of this disclosure.

Referring to FIG. 10, a partial cross-sectional view of the safe 700 in a locked position is shown. The safe 700 includes a set of hinges 1004 for operatively coupling the cover 702 to the body 704. The hinges 1004 are heavy duty hinges welded to the frame 752 and the body 704. They provide minimal exposed fixing for added security. A chamber 1002 is formed between the walls of the body 704 and the inner box 706. The chamber 1002 communicates with the chamber 902. The double wall structure of the safe 700 provides added structural integrity and thus increase security.

Figure 11:
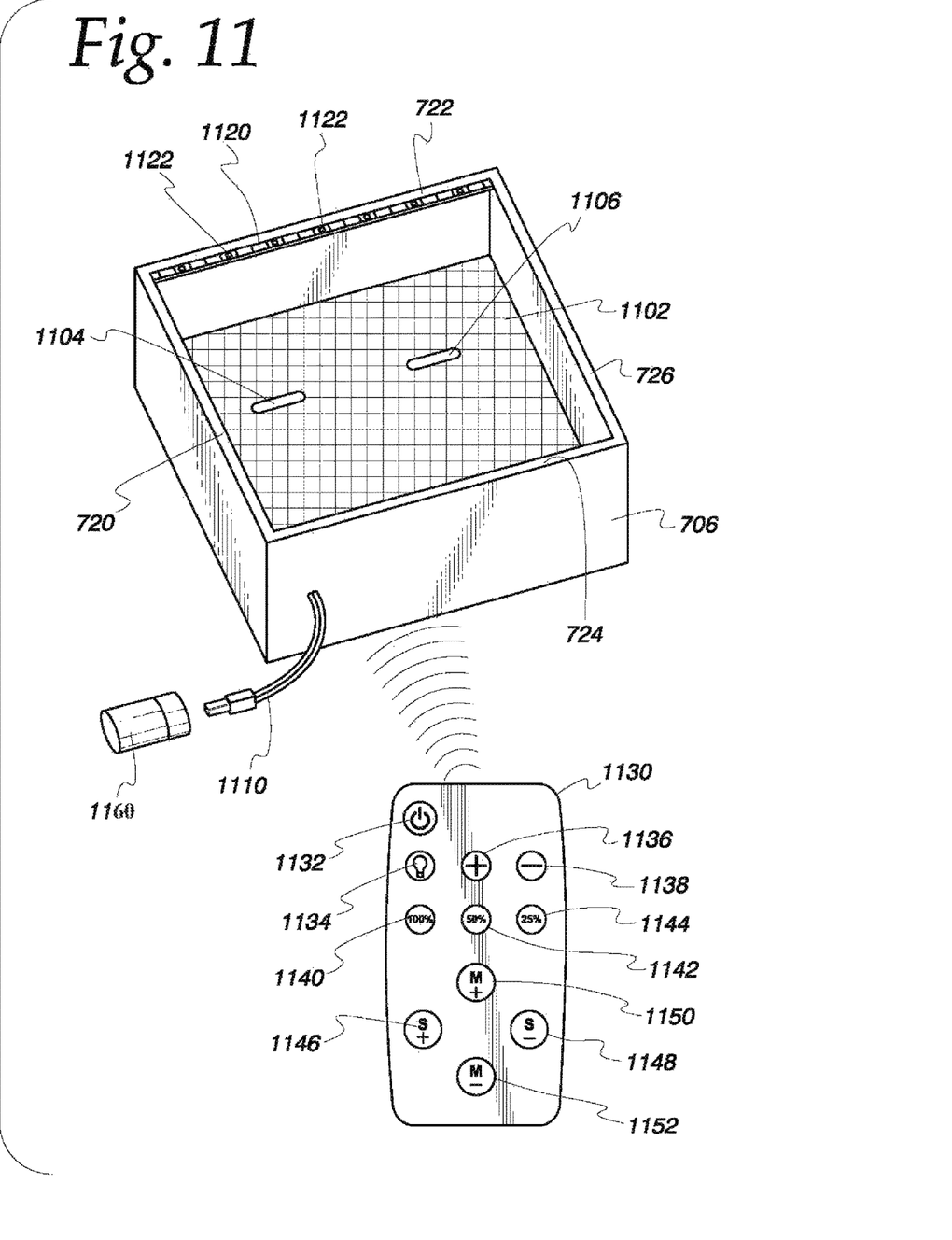
FIG. 11 is a front perspective view of an inner box of a stationary display safe and a remote control in accordance with the teachings of this disclosure.

Referring to FIG. 11, a front perspective view of the inner box 706 and a remote control 1130 are shown. A decorative layer (such as red velvet) 1102 is placed on the bottom of the inner box 706. One or more magnets 1104 and 1106 are attached to the bottom of the inner box 706. The magnets 1104-1106 can be placed on top of or beneath the decorative layer 1102. The magnets 1104-1106 (such as the magnet 214) are used to held valuable items, such as the firearm 106 or collectible coins, in space.

In a further implementation, a strip of lighting devices (such as LEDs) is attached to one or more of the walls of the inner box 706. To avoid compromising the aesthetical appealing of safe 700, the strips 1120 of lighting devices are placed right beneath the lips 720, 722 and/or 724. In such a case, the strips 1120 are likely not visible to a person standing in front of the cover 702. The strip 1120 includes one or more lighting devices (such as LEDs) 1122 for even distribution of light and increased appealing of the safe 700 and the firearm disposed therein.

The lighting devices 1122 are powered by a battery 1160 or external power via a power cable 1110. The battery 1160 can be a rechargeable battery. The battery 1160 and the cable 1110 are disposed within the chamber 1002. A lighting control device can also be disposed within the chamber 1002. The lighting control device is remotely controlled and operated by a remote control 1130. In one implementation, the remote control 1130 communicates with the lighting control device over a wireless link (such as BlueTooth, WiFi, etc.). The remote control 1130 includes a power button 1132 for turning on or off power supply to the lighting control device, a light button 1134 for turning on or off the lighting devices 1122, a brightness increase button 1136, a brightness decrease button 1138, a 100% brightness button 1140, a 50% brightness button 1142, a 25% brightness button 1144, a next lighting mode button 1150, a previous lighting mode button 1152, a lighting flash speed increase button 1146, and a lighting flash speed decrease button 1148.

The chamber 1002 can also house other components, such as the location device 302, a Geo-fence subsystem, an alarm or other devices. The Geo-fence subsystem has the capability of sending a text message to a preconfigured cell phone when the safe 700 is moved out of a predetermined geographical range. The chamber can also house a security system, such as the security subsystem 310 or a geo-fence system. The security system is connected to commercial security systems, such as ADT™ home security systems.

In a further implementation, the bottom of the body 704 incorporates one or more apertures 780 for affixing the safe 700 to a fixed structure, such as beams of a house.

Obviously, many additional modifications and variations of the present disclosure are possible in light of the above teachings. Thus, it is to be understood that, within the scope of the appended claims, the disclosure may be practiced otherwise than is specifically described above without departing from the true spirit and scope of the present invention. For example, the entire front cover 110 can be made of different transparent materials that are hard to break. As an additional example, the location device 302 uses different location determination algorithms other than triangulation. As still a further example, the locking mechanisms 208-210 are placed on the right edge or the left edge of the front side 202. As another example, the locking system 800 is, for example, a combination lock, a RFID lock, a NFC enabled lock system, or a biometric based locking system (such as finger print or facial recognition based locking systems).

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. For example, in the illustrated embodiments, directional representations—i.e., up, down, left, right, front, rear and the like, used for explaining the structure and movement of the various elements of the present disclosure, are relative. These representations are appropriate when the elements are in the position shown in the Figures. If the description of the position of the elements changes, however, it is assumed that these representations are to be changed accordingly. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A stationary display safe comprising:
   i) a body incorporating a body bottom and four body walls and adapted to be affixed to a stationary structure;
   ii) an inner box adapted to be disposed within said body and housing a set of magnets for holding an item in space;
   iii) a front cover having a frame and a high impact resistant glass operatively coupled to said frame, said frame rotatably coupled to said body for opening and closing said stationary display safe, wherein said high impact resistant glass is transparent; wherein said inner box incorporates three inward lips and an outward lip extending from four inner box walls of said inner box, wherein said glass mates with said inner box lips when said safe is closed; and
   iv) a locking system including a latch bolt set mounted to said frame, a lock set attached to said body, a latch retainer set disposed within said body, and a tamper resistant latch rod connecting said lock set with said latch retainer set for locking or unlocking said safe, wherein said latch retainer set is adapted to receive and release said latch bolt set.

* * * * *